S. Gissinger,
Brick Machine.
N° 36,706. Patented Oct. 21, 1862.
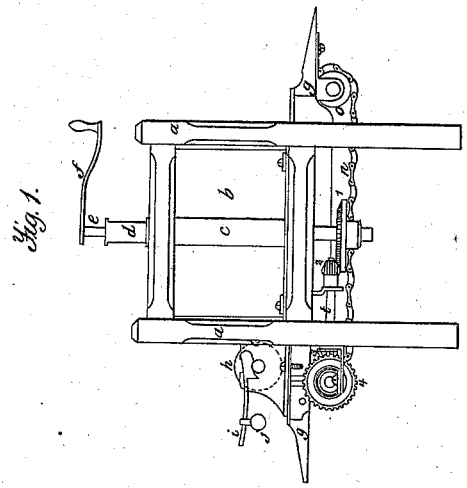
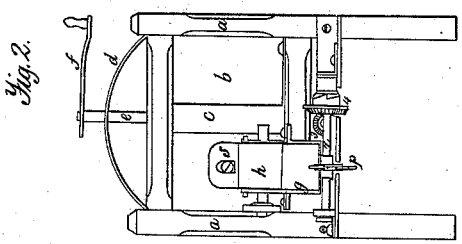
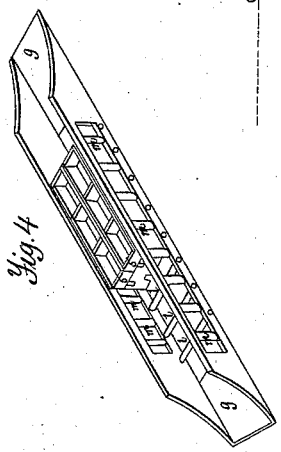
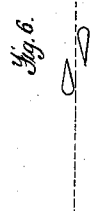
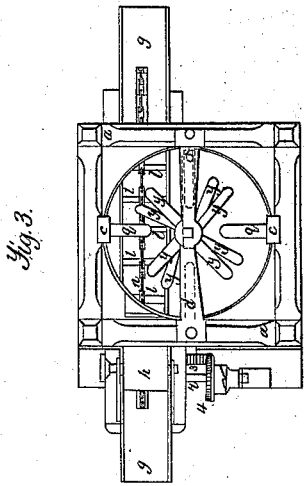
Witnesses.
James J. Johnston
George P. Steck.
Inventor.
Samuel Gissinger

UNITED STATES PATENT OFFICE.

SAMUEL GISSINGER, OF ALLEGHENY CITY, PENNSYLVANIA.

IMPROVEMENT IN BRICK-MACHINES.

Specification forming part of Letters Patent No. 36,706, dated October 21, 1862.

*To all whom it may concern:*

Be it known that I, SAMUEL GISSINGER, of the city and county of Allegheny, and State of Pennsylvania, have invented a new and Improved Brick-Machine; and I do hereby declare that the following is a full and exact description thereof, reference being had to the accompanying drawings, and to the letters of reference marked thereon.

The nature of my invention consists in an arrangement of moldway, gage, press-roller, and tempering apparatus, the whole being arranged, constructed, and operated in the manner hereinafter described.

To enable others skilled in the art to make and use my invention, I will proceed to describe its construction and operation.

In the accompanying drawings, Figure 1 is a side view of the machine. Fig. 2 is an end view. Fig. 3 is a top view. Fig. 4 is a perspective view of the moldway. Fig. 5 is a cut or sectional view of the gage. Fig. 6 is a cut or sectional view of the arms used in the tempering apparatus.

$a$ is the frame of the machine.

$b$ is the hopper of the tempering apparatus.

$c$ are four staves, which are placed in the sides of the hopper $b$, and are used for supporting the arms $q$.

$y$ are arms, which are placed spirally on the upright shaft $e$, which is held in position by the arch $d$ and a bearing in the bottom of the hopper $b$. The upper end of the shaft $e$ is furnished with a crank or draft-beam, $f$. The arms which are placed in the staves $c$ and on the shaft $e$ are made thin at one edge and thick at the other, as represented in Fig. 6, and so arranged the thin or sharp edges move toward each other when operating the tempering apparatus, thereby causing a rubbing and grinding action, thus breaking all the dry lumps of clay, and completely mixing and tempering the clay before it enters the molds at the bottom of the hopper. By the spiral arrangement of the arms $y$ on the shaft $e$ the clay is carried down and pressed through an opening made in the bottom of the hopper into the brick-molds. The moldway $g$, which is made in the form represented in Fig. 4, is secured to the bottom of the hopper $b$. The sides and bottom of the moldway are furnished with rollers, (marked $l$ and $m$,) by means of which a very great amount of friction is avoided and the wearing of the molds greatly diminished. On the front end of the machine and directly over the moldway is placed a press-roller, $h$, on the axles of which rest two levers, $i$, which are furnished with weights $j$. These levers and weights are used for the purpose of regulating the force or pressure of the roller $h$. Back of the press-roller is placed a gage, $s$, which is secured to the hopper $b$, and held in the desired position by means of a set-screw. The part of the gage marked $x$ extends into the hopper $b$. It will be observed that by the peculiar form of the gage $s$ it will perform a threefold function, to wit: first, graduating the depth of the clay in the molds; second, guiding the molds as they pass to the press-roller $h$ and preventing them from rising up in the hopper; third, cleaning the roller by scraping off all the clay that may happen to stick to it.

$n$ is an endless chain, which is placed around the pulley $o$ at the back end of the moldway $g$, passing over the rollers $l$, (see Fig. 3,) and around pulley $p$ on the shaft $r$, and is used for carrying the brick-molds through the moldway $g$.

1 is the driving-wheel, which is placed on the lower end of the upright shaft $e$, and gears into the wheel 2 on shaft $t$, on the front end of which is a wheel, (marked 3,) which gears into the wheel 4 on the shaft $r$. The shaft $r$ is made operative or inoperative by means of an ordinary coupling, which couples with the wheel 4, and is operated in the usual manner of operating couplings.

The operation of my improvement is as follows: Having all things arranged, constructed, and operating as described, and represented in the accompanying drawings, I take clay which is slightly moistened with water, and put it into the hopper. I then apply power to the crank or draft-beam $f$, which will turn the shaft $e$, which will cause the wheel 1 to operate the wheels 2 and 3 on the shaft $t$, which will operate the wheel 4 and the pulley $p$, which operate the endless chain $n$, which will carry the brick-molds along the moldway $g$. The brick-molds are of ordinary construction, and are furnished with bearing-off boards, on the front end of which are placed hooks which catch in the endless chain, thereby carrying the molds along the moldway $g$. The roller $h$ will press the clay firmly into the molds as they pass under the roller.

The machine is supplied with the molds from the back end of the machine, and the molds as they pass from under the roller $h$ are borne off and treated in the usual manner.

Having thus described the nature, construction, and operation of my improvement, what I claim as of my invention, and desire to secure by Letters Patent of the United States, is—

The use of the beveled arms $y$ and $q$, and the gage $s$, when used in combination with the press-roller $h$, lever $i$, and moldway $g$, arranyed and operated substantially as herein described, for the purpose set forth.

SAMUEL GISSINGER.

Witnesses:
JAMES J. JOHSTON,
GEORGE P. STECK.